United States Patent [19]

Zangger et al.

[11] 4,117,402

[45] Sep. 26, 1978

[54] APPARATUS FOR MEASURING THE WALL THICKNESS OF A MOVING TUBE WHEREIN AT LEAST ONE MEASURING BODY INSIDE THE TUBE MAY BE LIFTED OFF THE TUBE BY THE MOTION OF THE TUBE

[75] Inventors: Heinrich Zangger, Orpund; Heinz Zumbach, Biel, both of Switzerland

[73] Assignee: Zumbach Electronic AG., Orpund, Switzerland

[21] Appl. No.: 793,058

[22] Filed: May 2, 1977

[30] Foreign Application Priority Data

May 10, 1976 [DE] Fed. Rep. of Germany ....... 2620560

[51] Int. Cl.² .......................................... G01R 33/12
[52] U.S. Cl. ..................................... 324/220; 324/231
[58] Field of Search ................. 324/34 R, 34 TK, 37, 324/40, 219, 220, 231; 15/104.06 R

[56] References Cited

U.S. PATENT DOCUMENTS

| | | | |
|---|---|---|---|
| 2,563,254 | 8/1951 | Lewis | 324/34 TK |
| 2,882,488 | 4/1959 | Price et al. | 324/37 |
| 3,107,379 | 10/1963 | Hill | 15/104.06 R |
| 3,864,625 | 2/1975 | Zumbach et al. | 324/34 TK |

Primary Examiner—Robert J. Corcoran

[57] ABSTRACT

Apparatus for measuring the wall thickness of a moving tube, for example an extruded tube of synthetic plastics material, comprises means for location in a stationary position within the tube and adapted to present at least one measuring body in resilient contact with the inner wall of the tube, and an external sensor for sensing the position of the measuring body. A mechanical linkage incorporating means engaging the tube wall is arranged to lift the measuring body away from the tube wall when excessive friction between the tube wall and the engagement means indicates a condition liable to damage the measuring body.

19 Claims, 3 Drawing Figures

APPARATUS FOR MEASURING THE WALL THICKNESS OF A MOVING TUBE WHEREIN AT LEAST ONE MEASURING BODY INSIDE THE TUBE MAY BE LIFTED OFF THE TUBE BY THE MOTION OF THE TUBE

BACKGROUND OF THE INVENTION

1. Field of the Invention

The present invention relates to apparatus for measuring the wall thickness of tubes, said apparatus comprising at least one measuring body which bears resiliently against the inner wall surface of the tube and which reacts upon a measuring device arranged externally of the tube wall.

2. Reference to Prior Art

Measuring devices of this kind are already known, see for example DT-OS No. 2,260,468. In the known device the measuring body is selectively applied to or removed from the inner wall surface by means of an electromagnet by external control. Apart from the fact that the necessity for having an electrical control line renders the construction comparatively complicated, this known construction also demands external arbitrary control.

SUMMARY OF THE INVENTION

The present invention provides apparatus for measuring the wall thickness of a moving tube, said apparatus comprising at least one measuring body, means for locating the or each said body within the tube so that it bears resiliently against the inner wall surface of the tube as the tube moves relatively thereto, a measuring sensor for location externally of the tube wall in order to sense the position of the measuring body or one of said bodies and thus the wall thickness of the tube, and, mechanical means controllable by the moving tube for lifting the measuring body or measuring bodies away from the tube wall. By means of the arrangement in accordance with the invention, it is possible to dispense with any means for operation or control from outside and to achieve a fully automatic mode of operation. Preferably the arrangement is such that the application of the measuring body, or measuring bodies, against the tube wall is controllable by means of the moving tube.

DESCRIPTION OF THE PREFERRED EMBODIMENTS

Figure 1:
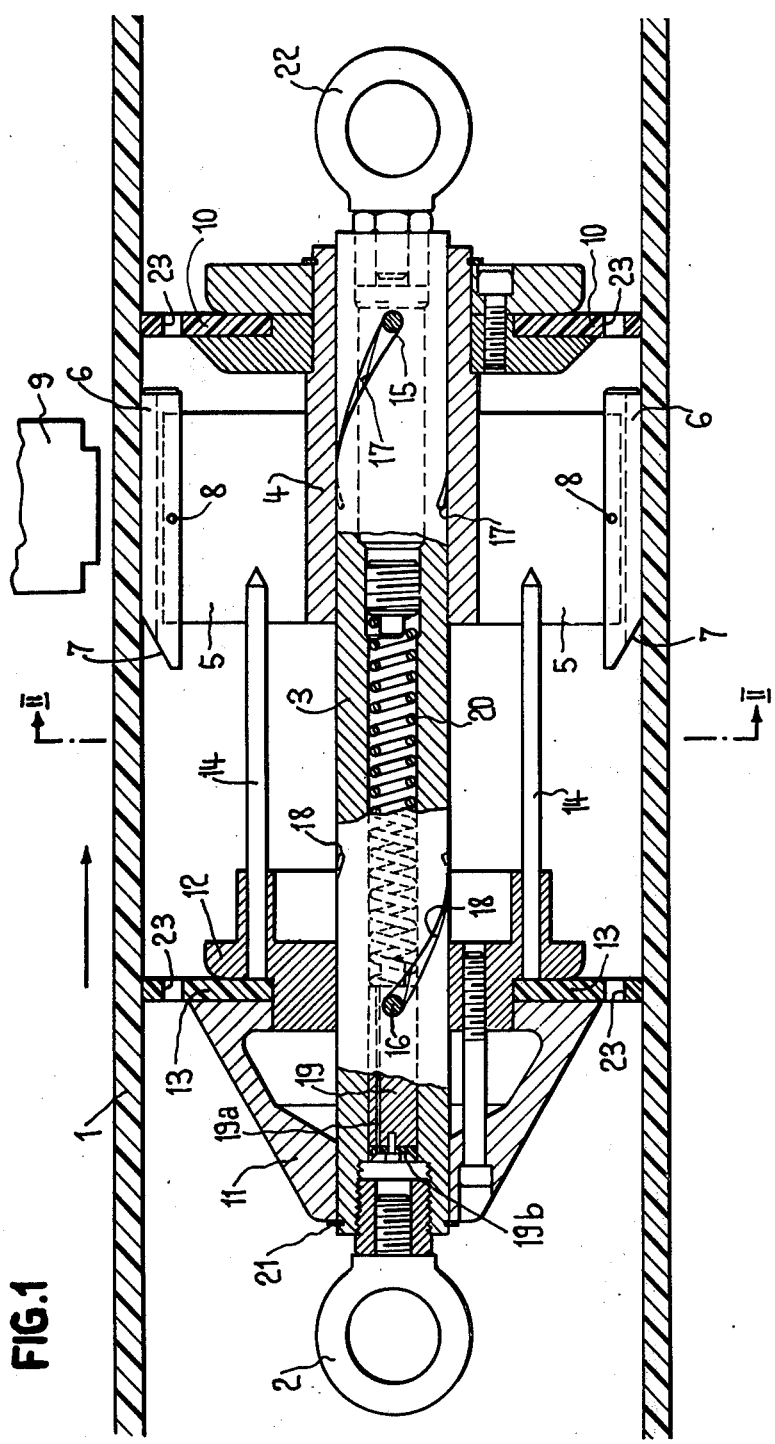
FIG. 1 shows a longitudinal section through a portion of a tube and of the apparatus according to the invention.
Figure 2:
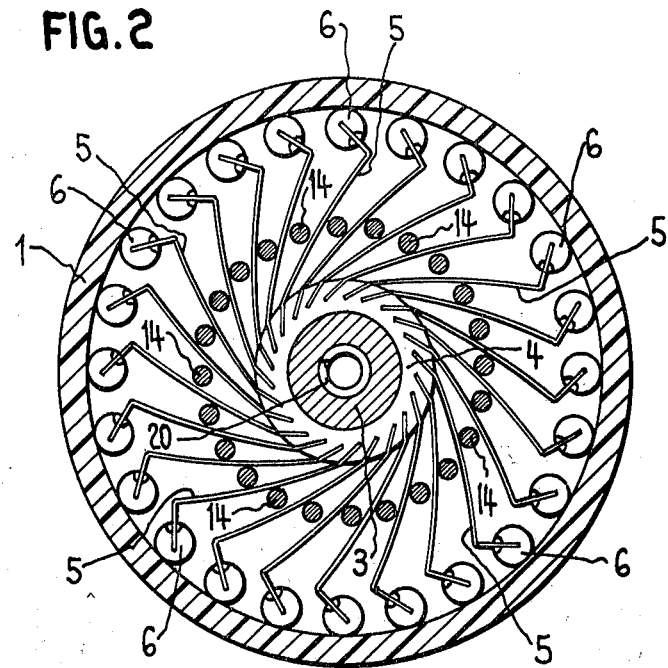
FIG. 2 shows a cross-section along the line II—II of FIG. 1

Referring to FIGS. 1 and 2, the tube 1 travels in the direction of the arrow from the left to the right from the nozzle of an extruder. To the mandrel of the extruder nozzle there is connected, by means of a cable or holder not shown in the drawing, a ring 2, which is also connected to the one end of a hollow mandrel 3 inside the tube. Upon that end of the mandrel 3 which is at the back with reference to the travelling direction of the tube, there is mounted for longitudinal and rotational displacement a hub 4, in which, as shown in FIG. 2, there are milled a circular formation of retaining slots. In each of the retaining slots engages the inner end of a leaf spring 5 of resilient material, for example beryllium bronze or the like. The bent outer end of each leaf spring 5 engages in a slot of a respective longitudinally extended cylindrical measuring body 6, these having a chamfer 7 at the forward end thereof as shown in FIG. 1. Each measuring body 6 is pivotally connected by means of a pin 8 to the leaf spring 5 supporting it, so that each measuring body is free to pivot to lie snugly against the inner surface of the tube. In the region of the measuring bodies 6, of which there are, for example, twenty four, there is located a measuring head 9 of known type having a measuring sensor. Preferably the measuring sensor is in the form of a measuring coil, the field of which penetrates the wall of the tube and is influenced by the adjacent measuring body 6. The reaction of the measuring body 6 upon the measuring sensor depends upon the mutual spacing distance between them, and when the measuring sensor is located a predetermined distance from the external wall of the tube, the reaction upon the measuring sensor also corresponds to the thickness of the tube wall lying between the measuring sensor and the adjacent measuring body 6. The measuring head 9 is, during the measurement operation, given a reciprocating movement in the peripheral direction so that the measuring sensor assumes at least once in each to and fro movement a position in which it approaches closest to one of the measuring bodies 6, and the measured value at that instant is determinative of the thickness of the tube wall at the measuring point. This measurement principle is already known per se and requires no further explanation in the present situation.

Upon the hub 4 there is secured a collar 10 by means of two discs which are screwed together, the diameter of the collar corresponding to the internal diameter of the tube to be produced. The collar 10 therefore bears with a light pressure and with a small amount of friction against the internal wall of the tube.

Upon the forward end of the mandrel 3, as seen with reference to the travelling direction of the tube, there is mounted a holder, comprising a ring 11 with a conical outer surface and a second ring 12. Between the rings 11 and 12 there is clamped securely a further collar 13 the external diameter of which likewise corresponds substantially to the internal diameter of the tube, and which therefore bears with a certain amount of friction against the inner wall of the tube. In this way the entire assembly comprising the mandrel 3, the hub 4 constituting a holder for the measuring body 6, and the holder consisting of the rings 11 and 12, is centered in the tube. Moreover the holder comprising the rings 11 and 12 is longitudinally displaceable and rotatable upon the mandrel 3.

In the ring 12 there are secured operating pins 14 in a circular formation, so that each of these operating pins 14 engages between two adjacent leaf springs 5. In the hub 4 and in the ring 12 there are inserted inwardly projecting pins 15 and 16 respectively, which engage in inclined slots 17, and 18 respectively of the mandrel 3, and which cause the hub 4 or the ring 12 to perform rotary motion when these parts are longitudinally displaced upon the mandrel 3. The pin 16 of the ring 12 penetrates a plug 19 which is mounted for longitudinal displacement in the bore of the mandrel 3, and acts upon a compression spring 20, which retains the holder comprising the rings 11 and 12 in the forward end position shown in the drawing, which is determined by the ring 11 abutting against the spring circlip 21. The plug 19 is provided with a longitudinal bore 19a and it carries a sealing collar 19b. To the rearward end of the mandrel 3 there is connected a further ring 22, to which can be anchored a closure member for producing an excess pressure in the tube. In each of the collars 10 and 13 there are provided pressure equalising apertures 23, which allow the establishment of a uniform pressure in front of, between and behind these collars, which collars may consist, for example, of "Vulkanol".

In the condition shown in FIG. 1, i.e., during the normal measurement, the holders 11, 12 and 4 are situated in the forward end position and the rearward end position respectively. The operating pins 14 engage substantially without clearance between the leaf springs 5 and permit them resiliently to apply the measuring bodies against the inner wall surface of the tube. The measurement can be effected in the manner already described.

It may be the case that substantial inwardly directed deformations and/or thickenings will appear in the tube wall. The passage of such thickened parts or inwardly directed projections over the measuring bodies whilst these are fully spread and bearing against the tube wall could damage these bodies and/or the leaf springs. In the described apparatus such distorted parts of the tube wall will carry the collar 13, together with the holder 11, 12, to the right as viewed in FIG. 1, with a simultaneous clockwise rotation of the holder 11, 12 as viewed in FIG. 2. The edge of the seal 19b is thereby somewhat deformed inwardly to make possible pressure balancing through the bore 19a so that the displacement of the plug 19 is not obstructed. The operating pins 14 carry with them the leaf springs 5 in the clockwise direction and press them radially inwards, whereby the measuring bodies 6 are removed from the inner wall surface of the tube. Any substantial inequalities in the tube wall do not therefore make contact when travelling over the measuring bodies and cannot damage the measuring bodies or the springs 5. When the deformed areas of the tube wall have passed through, then the holder 11, 12 is again displaced forwardly into the rest position shown in the drawing under the action of the spring 20, so that a return motion in the counterclockwise direction takes place, during which the operating pins 14 release the leaf springs 5 and the measuring bodies are again seated against the inner wall of the tube. The return action of the holder 11, 12 takes place with a certain amount of delay, because the sealing ring 19b bears intimately against the wall of the bore. This delay has the effect of avoiding the premature spreading of the measuring bodies into their working position before the thickened portions of the tube wall have travelled beyond the measuring bodies.

It is also desirable, upon first introducing the assembly shown in FIG. 1 into the advancing end of the tube when starting up the operation of the extruder, to contact the measuring bodies 6 inwardly and thereby to prevent any damage to the measuring bodies and to the leaf springs 5. This object can be achieved by displacing the hub 4 forwardly upon the mandrel 3, whereby rotation of the hub 4 causes the operating pins, which in this case are stationary, to become engaged by the springs 5 rotating with the hub 4 so that the springs 5 are forced inwardly. When the assembly is inside the tube, then the frictional force set up between the travelling tube and the collar 10 causes the hub 4 to be carried to the right (as viewed in FIG. 1) with the collar and to rotate back into position. During this time the leaf springs 5 are again able to move outwardly and to press the measuring bodies 6 against the inner wall surface of the tube.

Various practical modifications are possible. The operating mechanism for spreading and constricting the leaf springs and the measuring bodies can be modified so that it is not necessary to cause rotary displacement of the two holders. In particular, if a less number of measuring bodies are provided, thereby allowing more free space between the leaf springs 5, it will be possible to provide wedge shaped operating members with inclined surfaces, which, during relative longitudinal displacement of the holders, engage with the springs to contract them inwardly.

Figure 3:
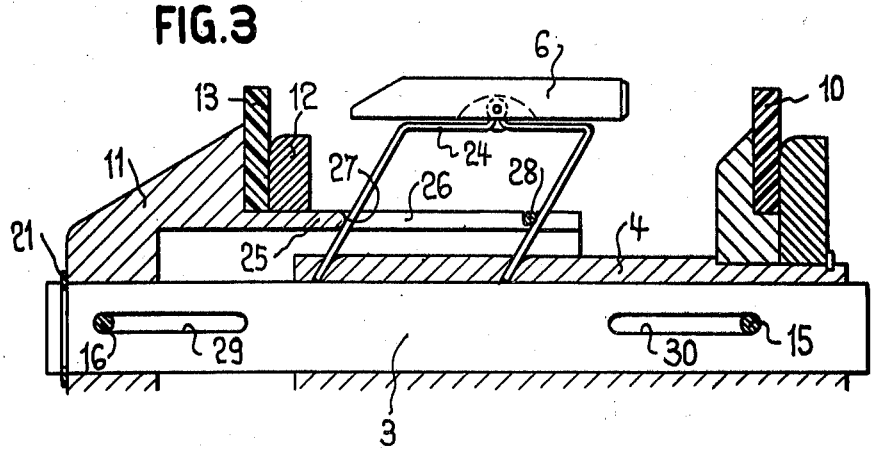
FIG. 3 is a longitudinal section through a further embodiment of apparatus according to the invention.

FIG. 3 shows another modification, wherein like components are indicated with the same reference numerals as those in FIGS. 1 and 2. The leaf springs 5 are replaced by yokes 24 of spring wire. The ring 11 carries a cylindrical extension 25 with axial slots 26, so that each yoke 24 engages in a slot 26 and is thereby held in the radial position. Of each yoke 24 the forward limb bears against the rounded end surface 27 at the inner end of the slot 26, whilst the rearward limb of the yoke 24 bears against a wire ring 28, which is inserted in an annular slot of the extension 25. The respective holders 4 and 11, 12 respectively are axially guided upon the mandrel 3 by means of pins engaging in slots 29 and 30. In this case the collars 10 and 13 are not provided with any apertures 23, and they serve as sealing rings for establishing an excess pressure in the portion of the tube situated in front of the auxiliary assembly shown in the drawing.

As described above, if, prior to introducing the assembly into the end of the emerging tube, the holder 4 is displaced forwardly, or if, during the performance of a measurement, the holder 11, 12 is carried rearwardly by thickened portions of the tube, then by means of the surfaces 27 and the wire 28 the yokes are caused to descend rearwardly and thereby the measuring bodies are displaced inwardly. It may also be necessary to provide for the holder 4 a braking device for retarding the return of the holder 4 into the rest position illustrated in the drawing, similar to that represented in FIG. 1 for the holder 11, 12, in order to allow the spreading action of the measuring bodies to be delayed.

The spring wire of the yoke 24 shown in FIG. 3 may have any suitable cross-section. Whilst it has been assumed that this would be a wire of round cross section, it is nevertheless preferable to employ a flat spring wire, possibly a leaf spring, the flat sides of which are oriented in the peripheral direction. Yokes made of such a flat spring steel are easily deformed in the axial direction, and can be distorted in the manner described with reference to FIG. 3, thereby constricting the measuring bodies, whilst these yokes nevertheless exhibit a substantial stiffness in the peripheral direction. In such a case the guide slots 26 of FIG. 3 are no longer necessary. It is also not absolutely essential to impose axial forces upon both limbs of the yoke for the purpose of deforming the yokes and constricting the measuring bodies. Thus, when employing the yokes here described made of flat spring steel, the extension 25 need only extend up to the forward limb of the yoke, that is to say up to the end surface 27 shown in FIG. 3. The outer axially directed webs of the yokes can be arranged to engage with some clearance in flat grooves at the inner side of the measuring bodies and thereby stabilise the measuring bodies against rotation about a radial axis. In this case it is also possible to simplify the connection between the measuring bodies and the yokes, especially if yokes of flat spring steel are available. In this case it suffices to employ for the connection a screw or a rivet penetrating a hole in the yoke whilst the screw or rivet is permitted a certain amount of axial and radial clearance in the hole. Instead of using the wire yokes described and shown in the drawing it is possible to provide spring wire supports of other constructions.

If, as already explained with reference to FIG. 3, the assembly including the measuring bodies is also employed as a plug for establishing an excess pressure in the tube, it is also possible to provide more than two sealing collars 10 and 13. Also it is possible, for example, to provide sealing collars only upon the holder 4, whilst the collar 13 is designed with apertures 23 as shown in FIG. 1 so that excess pressure is produced also in the region of the measuring bodies 6.

If the assembly carrying the measuring bodies is connected rigidly to the mandrel of the extruder by means of a support, it will not in general be possible to employ the collars 10 and 13 bearing against the inner wall of the tube, because the material of the tube is too soft. In such a case, as well as in other cases, it may be necessary, when starting up the operation, not to cause the holder 4 to be restored to its rest position shown in the drawing by the travelling tube, but instead to provide, for example, a cable connected to the holder 4 for the purpose of drawing it rearwardly as soon as the assembly has been installed in the leading end of the tube.

In the foregoing specification and in the following claims, by the expression tube there is to be understood any desired hollow profile, for example of round or rectangular cross-section.

We claim:

1. Apparatus for measuring the wall thickness of a moving tube, comprising at least one measuring body, a support adapted for location in a stationary position within said moving tube, means for resiliently applying said measuring body against the inner surface of the wall of said tube as the tube moves relatively thereto, a measuring sensor for location externally of the tube wall in order to sense the position of the measuring body and thus the wall thickness of the tube, a holder displaceable relatively to said support in the direction of the axis of the tube and supporting control means arranged to bear against the inner wall surface of the tube and to slide thereon, and mechanical linkage means between said holder and said measuring body, said control means and holder being adapted to be axially displaced relatively to said support by forces transmitted thereto from said tube, and said measuring body being removable from the tube wall through said linkage means upon axial displacement of said holder.

2. An apparatus according to claim 1, wherein said control means is a collar mounted on said holder.

3. Apparatus according to claim 2, wherein a further holder is axially displaceable upon said support and is mechanically linked to said measuring body whereby movement of said further holder axially in a direction opposite to the direction of movement of said tube is effective to remove said measuring body from the tube wall.

4. Apparatus according to claim 3, wherein said further holder also supports a collar arranged to bear against the tube wall, whereby frictional forces between the moving tube and the collar tend to maintain the further holder in a position in which said measuring body is allowed to contact the tube wall.

5. Apparatus according to claim 2, wherein said holder is spring biased relatively to said support in a direction counter to the direction of movement of the tube.

6. Apparatus according to claim 3, wherein the said measuring body is mounted upon one of said holders by means of a spring, and the other holder includes an abutment for engagement with said spring whereby relative axial movement of said holders is effective to stress said spring to remove the measuring body from the tube wall.

7. Apparatus according to claim 6, in which the holders are so mounted upon said support that they are caused to be rotated as a result of their relative axial motion upon the support, relative rotation between the two holders causing the said spring to be swung inwardly by means of the said abutment.

8. Apparatus according to claim 7, wherein the measuring body is pivotally pinned to the spring which supports it.

9. Apparatus according to claim 4, in which each said collar is provided with pressure equalising apertures.

10. Apparatus according to claim 4, comprising a ring of measuring bodies uniformly spaced in the peripheral direction, each measuring body being suspended upon said further holder by means of a leaf spring.

11. Apparatus according to claim 4, wherein each said collar is formed as a seal for preventing fluid flow axially of the collar.

12. Apparatus according to claim 3, wherein said further holder is adapted for connection to a traction cable or the like traction member.

13. Apparatus according to claim 2, including means for delaying the return of a said holder from its displaced position into its position of rest.

14. Apparatus according to claim 13, wherein said delaying means comprises a pneumatic brake having a piston displaceable in a bore to pump air through a bleed orifice when the holder is displaced in the return direction.

15. Apparatus according to claim 4, wherein a plurality of said measuring bodies are suspended by means of spring wire supports, which are connected to a said holder and which can be deformed by axial pressure for the purpose of constricting the measuring bodies.

16. Apparatus according to claim 15, wherein each wire support is in the form of a wire yoke, of which two limbs are connected to the holder.

17. Apparatus according to claim 16, wherein the wire yokes are of flat cross-section, of which the flat sides are oriented in the peripheral direction.

18. Apparatus according to claim 16, wherein an outer web of each wire yoke engages in a groove at the inner side of the associated measuring body.

19. Apparatus according to claim 18, wherein each measuring body is connected to the associated wire yoke by means of a screw or rivet engaging in a clearance hole of the wire yoke.

* * * * *